United States Patent
Scherteler et al.

(10) Patent No.: US 8,849,059 B2
(45) Date of Patent: Sep. 30, 2014

(54) METHOD AND DEVICE FOR GENERATING IMAGES HAVING A REDUCED ERROR RATE, HIGH RESOLUTION AND IMPROVED CONTRAST

(75) Inventors: Klaus Scherteler, Garching (DE); Falk Schubert, Munich (DE)

(73) Assignee: Eads Deutschland GmbH, Ottobrunn (DE)

( * ) Notice: Subject to any disclaimer, the term of this patent is extended or adjusted under 35 U.S.C. 154(b) by 613 days.

(21) Appl. No.: 13/055,621

(22) PCT Filed: Jul. 11, 2009

(86) PCT No.: PCT/DE2009/000971
§ 371 (c)(1),
(2), (4) Date: Apr. 14, 2011

(87) PCT Pub. No.: WO2010/009703
PCT Pub. Date: Jan. 28, 2010

(65) Prior Publication Data
US 2011/0182528 A1 Jul. 28, 2011

(30) Foreign Application Priority Data

Jul. 25, 2008 (DE) .......................... 10 2008 034 979

(51) Int. Cl.
| | |
|---|---|
| G06K 9/40 | (2006.01) |
| G06K 9/32 | (2006.01) |
| G06T 3/40 | (2006.01) |
| H04N 5/235 | (2006.01) |
| G06T 5/50 | (2006.01) |

(52) U.S. Cl.
CPC ...... H04N 5/235 (2013.01); *G06T 2207/20221* (2013.01); G06T 3/4061 (2013.01); *G06T 2207/20208* (2013.01); *G06T 2200/21* (2013.01); G06T 5/50 (2013.01)
USPC ............................ 382/274; 382/299; 382/300

(58) Field of Classification Search
USPC ......... 382/167, 169, 255, 260, 274, 284, 294, 382/299–300; 348/241, 254; 358/1.2, 3.26, 358/3.27
See application file for complete search history.

(56) References Cited

U.S. PATENT DOCUMENTS 6,304,286 B1 * 10/2001 Shirai et al. ...................... 348/51
7,379,612 B2 * 5/2008 Milanfar et al. ............... 382/254
(Continued)

FOREIGN PATENT DOCUMENTS

WO 2007/017835 2/2007

OTHER PUBLICATIONS

Gunturk et al, High-Resolution Image Reconstruction From Multiple Differently Exposed Images, IEEE Signal Processing Letters, vol. 13, No. 4, Apr. 2006.*

(Continued)

*Primary Examiner* — Andrae S Allison
(74) *Attorney, Agent, or Firm* — Greenblum & Bernstein, P.L.C.

(57) ABSTRACT

The invention relates to a method for generating images having a reduced error rate, high resolution and improved contrast from image sequences containing images having lower resolutions, which can be obtained from an image sensor having adjustable recording parameters. According to the invention, the image sequences of the images (K, R) having low resolutions are subjected to a combination of super-resolution processing (SR) and high dynamic range reconstruction processing (HDR) in order to obtain images having a reduced error rate, high resolution and improved contrast on the basis of redundant and complementary image information contained in the images having low resolution.

17 Claims, 3 Drawing Sheets

Image stack with complementary image information → HDR → Result image

Fusion of complementary image information (overexposure, underexposure) using the HDR method

(56) References Cited

U.S. PATENT DOCUMENTS

| | | | |
|---|---|---|---|
| 7,940,282 B2* | 5/2011 | Milanfar et al. | 345/606 |
| 8,326,071 B2* | 12/2012 | Murata | 382/255 |
| 2006/0165179 A1* | 7/2006 | Feuer et al. | 375/240.18 |
| 2006/0291750 A1* | 12/2006 | Milanfar et al. | 382/299 |
| 2007/0071362 A1* | 3/2007 | Milanfar et al. | 382/299 |
| 2009/0040364 A1* | 2/2009 | Rubner | 348/362 |
| 2011/0142366 A1* | 6/2011 | Young | 382/274 |
| 2011/0150331 A1* | 6/2011 | Young | 382/167 |

OTHER PUBLICATIONS

Haraldsson, H.B.; Tanaka, M.; Okutomi, M., "Reconstruction of a High Dynamic Range and High Resolution Image from a Multisampled Image Sequence," Image Analysis and Processing, 2007. ICIAP 2007. 14th International Conference on, vol., No., pp. 303, 310, Sep. 10-14, 2007.*

Choi et al, High Dynamic Range Image Reconstruction with Spatial Resolution Enhancement, The Computer Journal Advance Access published Oct. 4, 2007.*

Schubert, F.; Schertler, Klaus; Mikolajczyk, K., "A hands-on approach to high-dynamic-range and superresolution fusion," Applications of Computer Vision (WACV), 2009 Workshop on , vol., No., pp. 1,8, Dec. 7-8, 2009.*

Farsiu et al, Advances and Challenges in Super-Resolution (2004) Cached, International Journal of Imaging Systems and Technology, 2004.*

Haraldsson et al, Reconstruction of a High Dynamic Range and High Resolution Image from a Multisampled Image Sequence, 14th International Conference on Image Analysis and Processing (ICIAP 2007).*

Reinhard et al., "High Dynamic Range Imaging: Acquisition, Display, and Image-based Lighting", Morgan Kaufmann, ISBN:0125852630, 2006, pp. 115-165, 467-488.

Pham, "Spatiotonal Adaptivity in Super-Resolution of Under-Spampled Image Sequences", PhD thesis, Delft University of Technology, 2006, pp. 1-181.

Farsiu et al., "Advances and Challenges in Super-Resolution", Hist, 2004, pp. 47-57.

Zitova et al., "Image Registration Methods: A survey", Image and Vision Computing 21, 2003, pp. 977-1000.

Rad et al., "Multidimensional Image Enhancement from a Set of Unregistered and Differently Exposed Images," *Proceedings of SPIE*, Bellingham, VA, US, Bd. 6498, XP007910326, ISSN: 0277-786X, (Jan. 1, 2007).

Gevrecki et al., "Superresolution under Photometric Diversity of Images," *EURASIP Journal on Advances in Signal Processing*, vol. 2007, Article ID 36076, (2007).

Wang et al., ."A Novel Image Reconstruction Method Expanding Dynamic Range and Spatial Resolution," *Proceedings of the 2006 IEEE International Conference on Robotics and Biometrics*, (Dec. 2006).

Choi et al., "High Dynamic Range Image Reconstruction with Spatial Resolution Enhancement," *The Computer Journal*, Oxford University Press, vol. 52, No. 1, (2009) (originally published online Oct. 4, 2007).

* cited by examiner

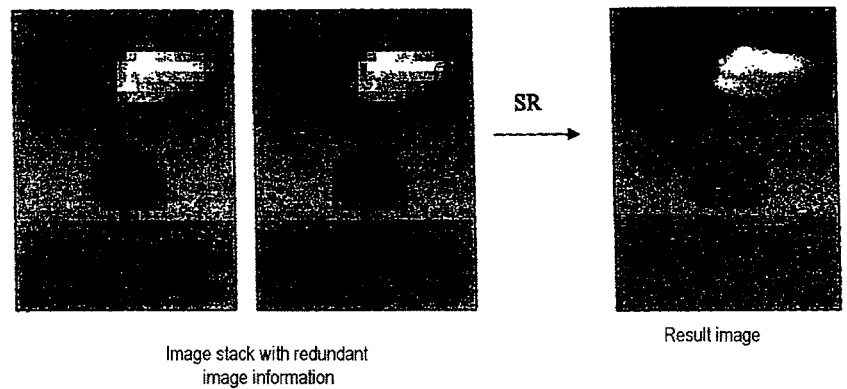
Fig. 1 Fusion of redundant image information using the superresolution method
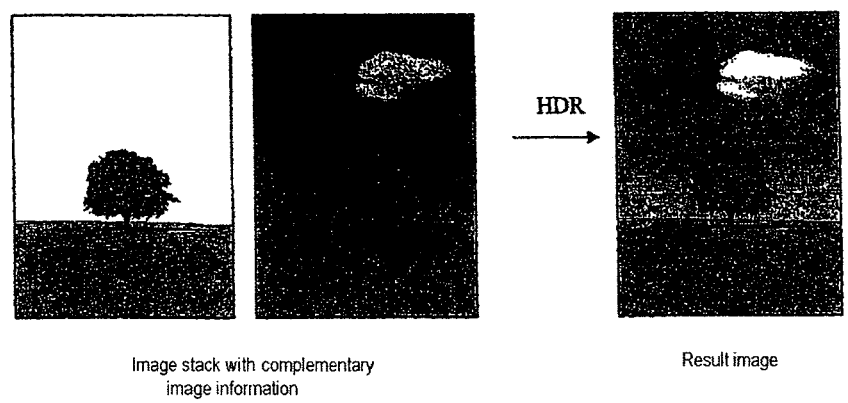
Fig. 2 Fusion of complementary image information (overexposure, underexposure) using the HDR method

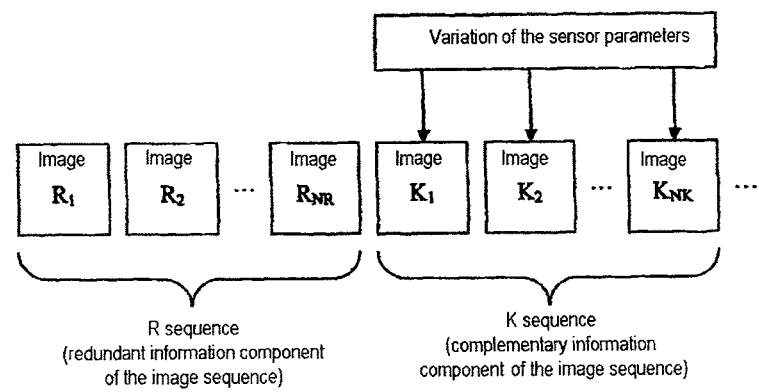
Fig. 3 Alternately successive sub-sequences of images with redundant and complementary information components

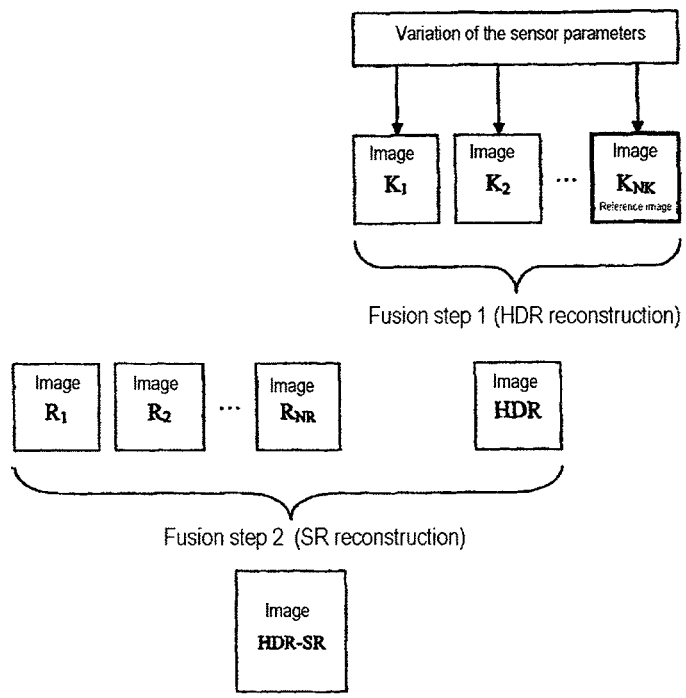
Fig. 4 Fusion of successive R and K sequences in fusion step 1 (HDR reconstruction) and fusion step 2 (superresolution) to form the result image (HDR-SR). In this case, the image $K_{NK}$ was chosen as the reference image for registration.
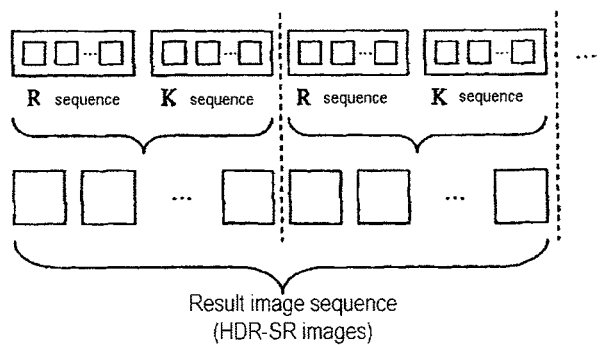
Fig. 5 Production of the result image sequence from the fusion of the alternately successive R and K sequences

METHOD AND DEVICE FOR GENERATING IMAGES HAVING A REDUCED ERROR RATE, HIGH RESOLUTION AND IMPROVED CONTRAST

CROSS-REFERENCE TO RELATED APPLICATIONS

The present application is a U.S. National Stage of International Patent Application No. PCT/DE2009/000971 filed Jul. 11, 2009, and claims priority under 35 U.S.C. §119(a) and 365(b) of German Patent Application No. 10 2008 034 979.8 filed Jul. 25, 2008.

BACKGROUND OF THE INVENTION

1. Field of the Invention

The invention relates to a method for production of reduced-error, high-resolution and improved-contrast images from image sequences with low-resolution images, which are obtained by an image sensor with variable recording parameters.

2. Discussion of Background Information

Imaging sensor systems such as camera systems, irrespective of whether they are in the visible range or in the IR range, are subject to limits both with respect to the final image resolution (number of pixels) and the final dynamic range (contrast range). These quality factors are defined primarily by technical and financial constraints. Further constraints result from the type of system in which the imaging sensor system is implemented. For example, in flying platforms, the image resolution and the dynamic range of the sensor system cannot be increased indefinitely since this would significantly increase both the amount of data produced and the requirements for any downstream data transmission devices.

Contrary to general opinion, an increase in the number of the pixels in an image on its own does not automatically also mean an increase in the information content of the image, and in fact this is dependent on the capability to identify detail in the image.

A number of techniques are known whose aim is to improve the resolution and/or the dynamic range of images produced by imaging sensor systems with a given number of pixels, both of individual images and of image sequences, for example in the case of moving images.

In addition to the traditional techniques of image processing of individual images such as brightness normalization, contrast improvement, focusing, and noise suppression, methods are known in which a plurality of images in an image sequence (image stack) are subjected to common processing, so-called "fusion", in order to obtain one or more improved-quality images or an improved-quality image sequence from low-resolution images in an image sequence.

The aim of a first known type of quality improvement is to improve the dynamic range by using complementary information which is contained in a plurality of images in an image sequence, which images have been recorded with one sensor parameter being varied, for example the exposure, in order to obtain an image with an improved dynamic range. This type of dynamic processing is known as high-dynamic-range reconstruction processing (HDR) and is described, for example, in E. Reinhard, G. Ward, S. Pattanaik, P. Debevec, High Dynamic Range Imaging: Acquisition, Display and Image-based Lighting, Morgan Kaufmann, 2006, ISBN: 0125852630.

A further known type of image processing has the aim of processing redundant information contained in a plurality of low-resolution images contained in an image sequence or an image stack, so as to achieve high resolution and/or a reduction in errors. In this case, the recording parameters for example the exposure etc., are typically maintained for all the images in the image sequence that is used. This type of image quality improvement is known as superresolution processing, and is described in detail, for example, in M. Gevrekci, B. K. Gunturk, Super-Resolution Approaches For Photometrically Diverse Image Sequences, ICASSP, 2007, and in T. Pham, Spatiotonal Adaptivity in Super-Resolution of Under-Sampled Image Sequences, PhD thesis, Delft University of Technology, 2006 or in S. Farsiu, D. Robinson, M. Elad, P. Milanfar, Advances and Challenges in Super-Resolution, IJIST, 2004.

In known fusion methods for increasing the image quality, which are based on processing of an image sequence or of an image stack, use is generally also made of registration, that is to say mutual alignment of the individual images with respect to one another, typically with respect to a reference image. Registration methods such as these are described, for example, in B. Zitova, J. Flusser, Image Registration Methods: A Survey, 2003.

The disadvantage of the use of these methods has until now been that they are in each case applied only to a limited portion of the image information which can be obtained by the imaging sensor system. For example, the traditional image processing methods described initially operate only on the basis of individual images. Until now, the fusion methods for high-dynamic-range reconstruction processing (HDR) and for superresolution processing (SR) have been carried out only in the sense either of processing of the redundant information, in particular in superresoltuion processing, or exclusively the complementary information with the variation of sensor parameters, that is to say in particular high-dynamic-range reconstruction processing (HDR).

SUMMARY OF THE EMBODIMENTS

Embodiments of the invention are directed to a method and device for improved production of reduced-error, high-resolution and improved-contrast images or image sequences from a low-resolution image sequence.

Embodiments of the invention are directed to a method for production of reduced-error, high-resolution and improved-contrast images, in which the image sequences of the low-resolution images (K, R) are subjected to combined super-resolution processing (SR) and high-dynamic-range reconstruction processing (HDR) in order to create reduced-error, high-resolution and improved-contrast images on the basis of redundant and complementary image information contained in the low-resolution images.

Furthermore, embodiments are directed to a device that carries out the above-noted method.

Advantageous embodiments and developments are characterized in each of the dependent claims.

The invention provides a method for production of reduced-error, high-resolution and improved-contrast images from images in low-resolution image sequences which have been obtained by an image sensor with variable recording parameters. The method provides that the image sequences of the low-resolution images are subjected to combined super-resolution processing and high-dynamic-range reconstruction processing in order to create reduced-error, high-resolution and improved-contrast images on the basis of redundant and complementary image information contained in the low-resolution images.

According to one embodiment of the invention, the images in a first sequence of low-resolution images are subjected to high-dynamic-range reconstruction (HDR) processing, in which complementary information components of the low-resolution images are processed in order to increase the contrast.

According to another embodiment of the invention, the images in a sequence of low-resolution images are subjected to superresolution (SR) processing, in which redundant information components of the low-resolution images are processed in order to increase the resolution.

According to one embodiment of the invention, the sensor parameters are varied deliberately from one image to another during the high-dynamic-range reconstruction processing of the images in the first sequence.

In particular, the exposure time can be varied from one image to another as a sensor parameter.

The sensor parameters can be retained unchanged during the superresolution processing of the images in the second sequence.

According to one embodiment of the invention, the first sequence and the second sequence are different sequences of low-resolution images.

The first sequence and the second sequence can follow one another alternately in blocks.

Alternatively, the first sequence and the second sequence can be interleaved in one another.

According to one embodiment of the invention, in a first fusion step, the images in the first sequence are fused by high-dynamic-range reconstruction processing to form one or more increased-contrast images, and in a second fusion step, the increased-contrast image or images is or are used for superresolution processing, in order to attain one or more reduced-error, increased-resolution images.

According to one embodiment of the invention the first fusion step for HDR reconstruction processing and the second fusion step for SR processing are carried out successively. Alternatively, the two fusion steps can also be processed integrated in a common algorithm.

According to one embodiment, image sequences of reduced-error, high-resolution and improved-contrast images are in turn produced from the image sequences of low-resolution images.

The processing of the low-resolution images can include image registration in order to make the used images in a sequence coincide.

The image registration can be carried out with respect to a reference image from the sequence of low-resolution images.

According to one development of the invention, the sequence of low-resolution images can be produced continuously for superresolution processing, and the images of the sequence of low-resolution images can be produced for high-dynamic-range reconstruction processing initiated by automatic or manual control.

The invention also provides a device for carrying out the above method.

In particular, a device such as this can be software-controlled.

BRIEF DESCRIPTION OF THE DRAWINGS

Exemplary embodiments of the invention will be explained in the following text with reference to the drawing, in which:

FIG. 1 shows an example of fusion of redundant image information using the superresolution method, by processing an image stack with redundant image information;

FIG. 2 shows an example of fusion of complementary image information by high-dynamic-range reconstruction processing of an image stack with complementary image information;

FIG. 3 shows a schematic illustration of the production of alternately successive sub-sequences of images with redundant and complementary information components in order to produce reduced-error high-resolution and improved-contrast images from image sequences with low-resolution images, according to one exemplary embodiment of the invention;

FIG. 4 shows a schematic illustration of fusion of successive sequences for high-dynamic-range reconstruction processing and superresolution processing, in order to obtain a reduced-error, high-resolution and improved-contrast image, using an image obtained by the high-dynamic-range reconstruction processing as a reference image for registration, according to one exemplary embodiment of the invention; and FIG. 5 shows a schematic illustration of the production of a result image sequence, which contains reduced-error, high-resolution and improved-contrast images, from fusion of alternately successive sequences for superresolution processing and high-dynamic-range reconstruction processing.

DETAILED DESCRIPTION OF THE EMBODIMENTS

In the described exemplary embodiments for production of reduced-error, high-resolution and improved-contrast images, both redundant and complementary image information items are obtained from an image sensor with variable recording parameters, in order subsequently to fuse them. In this case, the term sensor parameters is intended to mean those variable parameters of the sensor whose variation is suitable for production of complementary image information, that is to say that image information which cannot be derived from a single image, but only from a sequence or a stack of images, in each case with varied sensor parameters. For the purposes of the invention, the parameter of the exposure time of the sensor, and/or the physical parameters which correspond to this, such as the integration time of the photons on the pixels (image elements) of the sensor or the choice of recording sensitivities within the sensor are particularly relevant in this case for the purposes of the invention.

The sensor parameter or parameters is or are chosen such that the low-resolution image sequence produced by the imaging sensor system contains both complementary and redundant information components.

FIG. 1 uses an example to show fusion of redundant image information by superresolution processing from an image stack, in this case illustrating two images, using redundant image information to form a result image with increased resolution.

FIG. 2 uses a corresponding example to illustrate fusion of complementary image information (over exposure, under exposure) by high-dynamic-range reconstruction processing of an image stack, in this case two images, using complementary image information to form a result image with increased contrast.

According to the exemplary embodiment illustrated in FIG. 3, the redundant and complementary information components within an overall sequence of images are represented by alternately successive sub-sequences of recorded images, specifically a sequence R for the redundant component and a sequence K for the complementary component. The number of individual images within the R sequence and K sequence can be predetermined.

The sub-sequences differ in that, in the case of the exemplary embodiment illustrated in FIG. 3, the sensor parameters remain unchanged in the R sequence for superresolution processing, that is to say, apart from scene changes such as illumination changes or movement of an object and/or sensor, this therefore comprises redundant multiple measurements.

In contrast to the R sequence, in the case of the K sequence which is used for high-dynamic-range reconstruction processing, one or more sensor parameters is or are varied deliberately from one image to another. If the exposure time or the corresponding physical variable is varied from one image to another as a sensor parameter to be varied, then the K-sequence corresponds to an exposure series. In this case, the differently exposed images also contain different and therefore complementary image information.

The fusion of the redundant and complementary information components in the evaluation and processing of the image sequence leads to a reconstruction of improved-contrast, high-resolution and reduced-error images or image sequences, referred to as the result image or result image sequence.

FIG. 4 shows one exemplary embodiment of the fusion of successive R sequences and K sequences to form one or more result images. In the exemplary embodiment illustrated here, the fusion for production of a result image HDR-SR is carried out in two steps.

In the fusion step 1, the images in a K sequence are fused by high-dynamic-range reconstruction processing, with one or more sensor parameters being varied, in order to form an increased-contrast image HDR.

Error reduction, for example noise reduction and increasing the resolution, is then carried out in a fusion step 2 by superresolution processing. In this case, the result image HDR previously obtained from the first fusion step is explicitly used in the second fusion step, in order to obtain improved contrast information within the superresolution processing. The result image obtained from the R sequence plus the HDR image is the image HDR-SR which is a reduced-error image with high resolution and high contrast.

Implicitly, all fusion steps may contain image registration which is used to make the individual images in a sequence coincide with one another. This is necessary in order to make the images that are produced before fusion coincide with one another, for example during movement of the sensor in the scene, with which a change in the perspective within the image is linked, such that the redundant and/or the complementary information content can be used. In the described exemplary embodiment, this image registration takes place relative to a preselected reference image. All the other images are therefore transformed, for example with the perspective being changed and/or distorted, such that they are made to coincide optimally with the reference image. Any of the images in an R sequence or K sequence may be used as a reference image.

FIG. 5 shows how the fusion steps 1 and 2 are carried out successively for all the individual images in the R sequence and K sequence as a reference image, by carrying out the two fusion steps, described above, according to one exemplary embodiment, such that the complete image sequence can be reconstructed with better contrast, high resolution and with reduced errors, as is illustrated as the result image sequence of HDR-SR images in FIG. 5.

Instead of being carried out successively according to one alternative exemplary embodiment, the described fusion steps 1 and 2 can also be carried out in an integrated form, to form a common fusion step.

In addition to alternating production of R and K sequences, according to another exemplary embodiment, the R sequence can be produced initiated all the time, and the K sequence can be produced initiated by automatic or manual control, for example only when the reconstruction of an improved-contrast, high-resolution and reduced-error individual image or an image sequence appears to be necessary.

In addition to the parameter of the exposure time, or the corresponding physical variable, it is also possible to vary other or additional sensor parameters for production of the K sequence, for example focusing or zoom.

One advantage of the invention is that improved-contrast, high-resolution and reduced-error images can be produced using an existing sensor system with comparatively low resolution. All that is necessary is to provide the ability to control a sensor parameter, such as the exposure time.

The data streams produced by the imaging sensor system are not increased in size, which means that existing data transmission devices, for example of the imaging sensor system for an image processing device, can be used unchanged. By way of example, in the case of a flying sensor platform (reconnaissance aircraft, drone), the improved-quality image sequence can be reconstructed, for example, after data transmission in a ground station.

The fusion of the redundant and complementary image sequences makes it possible to see details in the result image or in the result image sequence which cannot be seen consistently in any individual input image.

The invention claimed is:

1. A method for production of reduced-error, high-resolution and improved-contrast images from first and second image sequences of low-resolution images, which images are obtained by an image sensor with variable recording parameters, the method comprising:
   (i) subjecting images in the first image sequence to high-dynamic range reconstruction processing (HDR) in which complementary information components of low resolution images are processed in order to increase contrast and to produce at least one increased-contrast image; and
   (ii) subjecting images in the second image sequence to superresolution processing (SR) in which redundant information components of low resolution images are processed in order to increase resolution,
   wherein at least one image in the second image sequence is the at least one increased-contrast image (HDR) produced by step (i).

2. The method as claimed in claim 1, further comprising varying parameters of the image sensor from one image to another during the high-dynamic-range reconstruction processing (HDR) of the images in the first sequence.

3. The method as claimed in claim 2, wherein the parameter of the image sensor varied from one image to another is exposure.

4. The method as claimed in claim 1, wherein parameters of the image sensor are unchanged during the superresolution processing of the images in the second sequence.

5. The method as claimed in claim 1, wherein the first sequence and the second sequence are different sequences of low-resolution images.

6. The method as claimed in claim 1, wherein the first sequence and the second sequence follow one another alternately in blocks.

7. The method as claimed in claim 1, wherein the first sequence and the second sequence are interleaved in one another.

8. The method as claimed in claim 1, further comprising:
fusing, in a first fusion procedure, the images in the first sequence by HDR reconstruction processing to form the at least one increased-contrast images (HDR), wherein the at least one increased-contrast image (HDR) is provided for superresolution processing (SR) in a second fusion procedure in order to attain at least one reduced-error, increased-resolution images (HDR-SR).

9. The method as claimed in claim 8, wherein the first and second fusion procedures are performed successively.

10. The method as claimed in claim 8, wherein the first and second fusion procedures are processed in a common algorithm.

11. The method as claimed in claim 1, further comprising producing image sequences of reduced-error, high-resolution and improved-contrast images from the image sequences with low-resolution images.

12. The method as claimed in claim 1, further comprising registering individual low-resolution images of the image sequence with low-resolution images so that the sequences coincide.

13. The method as claimed in claim 12, wherein the image registration is performed with respect to a reference image from the image sequence with low-resolution images.

14. The method as claimed in claim 1, wherein the second sequence of low-resolution images is produced continuously for superresolution processing (SR), and the first sequence of low-resolution images is produced by the high-dynamic-range reconstruction processing (HDR) after initiation of one of an automatic and manual control.

15. A device for carrying out the method as claimed in claim 1, comprising:
an image sensor with variable recording parameters.

16. The device as claimed in claim 15, further comprising at least one processor structured and arranged to subject at least one increased-contrast image produced by the HDR processing from the first image sequence to SR processing in the second image sequence.

17. The device as claimed in claim 16, further comprising:
a sequencer for arranging the low resolution images to form image sequences.

* * * * *